United States Patent
Engrand et al.

(10) Patent No.: US 8,793,701 B2
(45) Date of Patent: Jul. 29, 2014

(54) METHOD AND SYSTEM FOR DATA REPORTING AND ANALYSIS

(75) Inventors: Ludovic Engrand, Torey (FR); Christophe Nasarre, Rieux (FR); Gilles Salinas, Aulnay sous Bois (FR)

(73) Assignee: Business Objects Software Limited, Dublin (IE)

( * ) Notice: Subject to any disclaimer, the term of this patent is extended or adjusted under 35 U.S.C. 154(b) by 774 days.

(21) Appl. No.: 12/471,490

(22) Filed: May 26, 2009

(65) Prior Publication Data

US 2010/0306782 A1   Dec. 2, 2010

(51) Int. Cl.
*G06F 3/00* (2006.01)
*G06F 7/00* (2006.01)
*G06Q 10/00* (2012.01)
*G06Q 10/10* (2012.01)

(52) U.S. Cl.
CPC .................................... *G06Q 10/10* (2013.01)
USPC ............................ 719/312; 707/600; 705/1.1

(58) Field of Classification Search
CPC ..... G06Q 10/06; G06Q 30/02; G06Q 10/067; G06F 17/30592; G06F 17/30477; G06F 17/30289; G06F 21/6218; Y10S 707/99943; Y10S 707/957; Y10S 707/99934
See application file for complete search history.

(56) References Cited

U.S. PATENT DOCUMENTS

| | | | |
|---|---|---|---|
| 8,463,736 B2* | 6/2013 | Bakalash et al. | 707/600 |
| 8,533,717 B2* | 9/2013 | Kilian et al. | 719/312 |
| 2004/0215626 A1* | 10/2004 | Colossi et al. | 707/100 |
| 2007/0150862 A1* | 6/2007 | Naibo et al. | 717/110 |
| 2007/0255574 A1* | 11/2007 | Polo-Malouvier et al. | 705/1 |

* cited by examiner

*Primary Examiner* — Tuan Dao

(57) ABSTRACT

Described are methods and systems related to data report and analysis. A first business intelligence (BI) block is imported to a host analytics user interface (UI). The first BI block includes synchronizable dimensions to synchronize values of the first BI block with other BI blocks, and propagatable dimensions to propagate values of the first BI block to other BI blocks. A host data context of the host analytics UI is updated by propagating the propagatable dimensions of the first BI block. A second BI block is imported to the host analytics UI. The second BI block includes at least one synchronizable dimension in common with at least one propagatable dimension of the first BI block. The synchronizable dimensions of the second BI block are synchronized to the updated host data context. The first BI block and the synchronized second BI block are rendered on the host analytics UI.

16 Claims, 7 Drawing Sheets

METHOD AND SYSTEM FOR DATA REPORTING AND ANALYSIS

TECHNICAL FIELD

Embodiments of the invention generally relate to computer systems, and more particularly to methods and systems for data reporting and analysis.

BACKGROUND

Business Intelligence (BI) generally refers to a category of software systems and applications used to improve business enterprise decision-making and governance. These software tools provide techniques for analyzing and leveraging enterprise applications and data. These tools are commonly applied to financial, human resource, marketing, sales, service provision, customer, and supplier analyses. More specifically, these tools can include: reporting and analysis tools to analyze, forecast and present information, content delivery infrastructure systems for delivery, storage and management of reports and analytics, data warehousing systems for cleansing and consolidating information from disparate sources, and integration tools to analyze and generate workflows based on enterprise systems. Business Intelligence tools work with data management systems, such as relational databases or On Line Analytic Processing (OLAP) systems used to collect, store, and manage raw data and transactional data generated by enterprise systems.

For example, an insurance company may have a database that includes all of its policy holders and their current account information, including payment history, premium amount, policy number, policy type, exclusions to coverage, etc. These details can be thought of as dimensions along which corresponding measures can be consolidated through operations such as filtering and aggregation, for instance. Business Intelligence tools allow the insurance company to retrieve data from databases and generate reports based upon specific dimensions, measures and formulae thereon.

Business Intelligence tools available today can generate reports from diverse data sources that aid in decision-making. To enable such analysis, blocks of data from different data sources may need to be viewed in relation to each other in a form that allows a user to see trends or to make comparisons, for instance. Data blocks from diverse sources such as HTML files may also need to be combined with traditional analytical report parts to provide a comprehensive view of the data to the users. Many business intelligence tools provide for such composite analytical user interfaces in form of dashboards and composite applications, for example. However, when viewing such data, a user may want to have the ability to change the data context in order to view how the data will be affected by a changing scenario. Thus, there is a need for a tool that enables a user to swiftly change the context in which a collection of data parts are being viewed with a user interaction model that guides and enables the user to drill down into the details and analysis.

SUMMARY OF THE INVENTION

Embodiments of the invention are generally directed to methods and systems for data report and analysis. A first business intelligence (BI) block is imported to a host analytics user interface (UI). The first BI block may include synchronizable dimensions adapted to synchronize values of the first BI block with other BI blocks, and propagatable dimensions to propagate values of the first BI block to other BI blocks. A host data context of the host analytics UI is updated by propagating the propagatable dimensions of the first BI block. A second BI block is imported to the host analytics UI. The second BI block may include at least one synchronizable dimension in common with at least one propagatable dimension of the first BI block. In an embodiment, the second BI block may not have any synchronizable dimensions in common with propagatable dimensions of the first BI block. The synchronizable dimensions of the second BI block are synchronized to the host data context. The first BI block and the synchronized second BI block are rendered on the host analytics UI.

In an embodiment, a user input to modify one or more propagatable dimensions of the first BI block is received at the host analytics UI. The host data context of the host analytics UI is updated by propagating the propagatable dimensions of the first BI block. Based upon the updated host data context, the synchronizable dimensions of the second BI block are synchronized. The modified first BI block and the synchronized second BI block are rendered on the host analytics UI. These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

DETAILED DESCRIPTION

Figure 1:
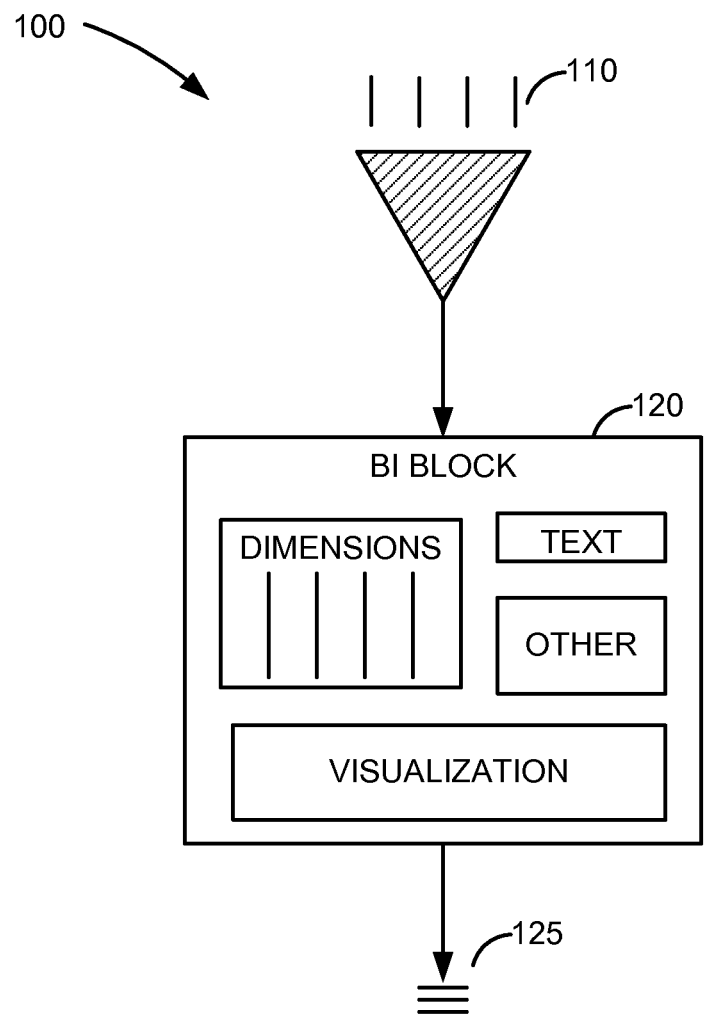
FIG. 1 provides a conceptual illustration of a data model for a BI block that allows for synchronizing a host data context of a user interface (UI) with various business intelligence (BI) blocks, according to an embodiment of the invention.

Embodiments of the invention are generally directed to methods and systems for data reporting and analysis. A host analytics user interface (UI) is described herein that manipulates business intelligence (BI) blocks to allow interactive user analysis of data. BI blocks comprising data that may relate to a subject of user's interest may need to be viewed within one or more UI containers of an analytics application as composite in order to allow the user to compare and contrast, to notice trends, and to see cause and effect between related blocks of data. BI blocks preferably are data blocks comprising one or more dimensions which are defined at least in part by specifying values (or value pairs) for these dimensions. The dimensions of the BI block may include synchronizable dimensions and propagatable dimensions.

The synchronizable dimensions of a BI block are operable to synchronize values of the corresponding BI block, based upon values of propagatable dimensions of other BI blocks. The synchronizable dimension may be described as a dimension that synchronizes a BI block based upon one or more values associated with the dimension. A synchronizable dimension may also be described as a dimension that receives one or more values to synchronize the BI block. The propagatable dimensions of a BI block are operable to propagate dimensions and corresponding values of the corresponding BI block to other BI blocks. The propagatable dimension may be described as a dimension that propagates one or more values associated with it to another BI block. The values that are propagated by the propagatable dimensions of one BI block may act as synchronizable dimensions to another BI block, and synchronize the other BI block based upon its values. A value of a dimension may be described as a metric or a quantity (for example, numeric quantity) that has been defined for a particular dimension. For instance, for the dimension "YEAR", the value is "2009". A change in the value of the dimension may correspond to a change in the synchronization of one or more BI blocks. For instance, considering a dimension D1, which is a propagatable dimension for BI block B1 and a synchronizable dimension for BI block B2, if the value of propagatable dimension 'D1' of BI block BI changes, the change is communicated to BI block B2 as D1 is a synchronizable dimension of BI block B2. The BI block B2 is synchronized based upon the new value of its synchronizable dimension D1. The values may be changed based upon a user interaction, an updating of dimension that occurred during processing, and the like.

BI blocks can be made of typical report parts such as sections, filters and axis such as columns of a table. BI blocks however need not be limited to report parts. Any block of data defined in part by specific dimensions can be considered a BI block. For instance, a hypertext markup language (HTML) page defining a stock ticker can be a BI block with company name and date as synchronizable dimensions. Likewise, a UI element such as a slider with variable values for a propagatable dimension can also be considered a BI block. Nevertheless, at least some of the BI blocks contained within a host analytics UI, hosting the composite of the various BI blocks may share one or more dimensions. As a result, a change in the value of one of the dimensions in one of the BI blocks may need to be propagated to other related BI blocks so that the composite can be viewed cohesively within a synchronized host data context. Hence, various BI blocks may be synchronized based upon the changes made to one of the BI blocks. This synchronization involves synchronizing the synchronizable dimensions of a BI block with propagatable dimensions of one or more other BI blocks that have at least one synchronizable dimension in common with the propagatable dimension of the former BI block. This synchronization of the various BI blocks may lead to changes being made to some of the BI blocks that are impacted by the propagation and synchronization.

The impacted BI blocks may also undergo changes during a later instance, and these changes may in turn influence all other BI blocks. Thus, each of the BI blocks has an ability to accept changes made to them by synchronizing themselves, and in turn propagate these changes to other BI blocks that have an association with them. The association that may exist between two or more BI blocks may include—having at least one synchronizable dimension of one BI block in common with one propagatable dimension of the other BI block. Each BI block may include some data of interest to a user and is defined within a default context, which in one embodiment, is a collection of variable dimensions and their corresponding values. The host data context of each BI block defines what is contained in its data. In an embodiment, BI blocks are hosted within a host data context and the host analytics UI provides a default context into which new BI blocks are imported by default.

Each BI block renders its content based on a value of the synchronizable dimension that is inferred from the default context. The default context may be a context repository that typically stores each of the BI blocks and corresponding content including synchronizable dimensions and propagatable dimensions and any such information about the BI block. Each BI block defines interactive zones; when the end user interacts with such a zone (through a mouse click or a mouse hover), the host analytics UI is notified about the value of the selected dimensions (propagatable dimensions), and broadcasts these changes to the other BI blocks of the same common context. The impacted BI blocks then react either by updating their rendering to highlight the selection or, in the case of a mouse click, by filtering its content based on the selected propagated dimension values.

A first BI block is imported into the host analytics UI, and added to the host data context of the host analytics UI. Its synchronizable dimensions are inferred from the hosting sections such as uniform resource locator (URL) parameters for an HTML page, and the like. The host data context maintains a first default context including the synchronizable dimensions and the propagatable dimensions of the first BI. The default context of the host analytics UI maintains a list of dimensions and corresponding value pairs that is updated when a new BI block is added. For example when the number of accidents per year for "2006" for the policy type "House" section is added, the policy type dimension is defined into the host data context with the "House" value. In one embodiment, the host data context may supersede the context of the BI block being imported. In another embodiment, the context of the BI block being imported supersedes the host data context.

Further, a second BI block is imported into the host analytics UI. The synchronizable and propagatable dimensions of the second BI block are added either to the existing first context or to a new context that is created in the host analytic UI. In the former case, the value of each synchronizable dimension is set based on the value found in the host data context. In an embodiment, the second BI block adopts the host data context, which could be defined at least in part by the first context of the first BI block. In another embodiment, the synchronization is accomplished by changing the host data context using the values of the dimensions of the second BI block. Regardless of how the synchronization is accomplished, changes to the host data context are propagated to BI blocks with at least one synchronizable dimension affected by the changed values of the host data context.

FIG. 1 provides a conceptual illustration of a data model for a BI block that allows for synchronizing a host data context of a user interface (UI) with various business intelligence (BI) blocks, according to an embodiment of the invention. The BI block 100 comprises of a set of dimensions such that a change in the values of one of these dimensions changes data associated with that particular BI block. It may be desirable to synchronize at least some of these dimensions with other related BI blocks. However, a user may prefer that not all dimensions defining the data contained in a selected BI block 100 be synchronizable. Thus, at 110, some dimensions of BI block 100 are designated as synchronizable. At 120, a definition for the UI, for instance a host analytics UI, rendering the data content is defined. The UI rendering can be in the form of traditional tables, charts, widgets, HTML blocks or even other UI representation of data such as a slider UI element that is a representation of value of some dimension. The UI may include several host data contexts, allowing comparison of a BI block with itself, for different values of the same dimension. For instance, a same bug report may be required for two different teams.

Next, at 125, rules for user interaction can be defined to specify how to interpret various user actions with respect to some of the dimensions of BI block 100. Such interaction rules 125 could comprise a list of dimensions of BI block 100 that can affect a context within which a composite of BI blocks may be viewed by a specified user action (for example, mouse click and mouse hover) selecting a value for the dimensions. For example, cell selection (for example, by a mouse hover over or a mouse click) by a user of a table corresponding to "2006" the value for a dimension "Year" could be propagated to change the context for other BI blocks which have designated the dimension "Year" as being synchronizable at 110.

In an embodiment, a default context defined with respect to the host analytics UI comprises a specified set of values for a collection of dimension parameters related to various BI blocks associated with the selected host analytics UI. In an embodiment, the default context takes the form of a list of dimensions/value pairs. Values for dimension parameters can be inferred from the BI blocks contained in the host data context. For example, when a BI block reporting on number of accidents per year for the year "2006" and for the policy type "House" is added to a host analytics UI, the policy type dimension/value pair for the host data context is updated with the "House" value and the year dimension/value pair is updated with a "2006" value. Thus, the BI block being imported into a host analytics UI can define the default context. Importing the BI block may include copying an instance of the BI block from an analytical report to the host analytics UI.

The analytical report may include one or more instances of the BI block arranged in a hierarchy, with each of the instances existing based on a combination of values of one or more dimensions. When a second BI block is imported into the host analytics UI, the second BI block can be added with its synchronizable dimensions set according to an existing host data context or alternatively, the existing host data context can be altered by the imported BI block. In an embodiment, the host data context may be updated based upon one or more rules that accept over-writing of one or more values of the synchronizable dimensions and the propagatable dimensions of the BI blocks. The second BI block added is now synchronized with the BI block existing in the host analytics UI, by synchronizing the synchronizable dimensions of the second BI block with the updated host data context, which reflects the propagatable dimensions and corresponding values of the first BI block.

In one embodiment, each BI block renders its contents in the host analytics UI based on the values of its synchronizable dimensions inferred from the default context. Alternatively, the imported BI block can redefine the default context. Regardless, the rest of the BI blocks hosted within the host analytics UI are synchronized with each other according to the default context and their respective data models that may designate one more of their dimensions as synchronizable. The default context need not be static or alterable only by addition or deletion of BI blocks. User interactions with various BI blocks can further alter the default context. For instance, each BI block has a user interaction rule set (for example, 125 in FIG. 1). When a user interacts with selected UI interaction zones in a visual rendering of the BI block, by actions such as a mouse click or a mouse hover, the interaction rules could call for the host analytics UI to be notified about any changes in values of the selected dimensions. These values can be used to alter the default context, which in turn can be broadcasted to the other BI blocks associated with the same default context. In one embodiment, the impacted BI blocks react to an end user action either by updating their rendering to highlight or otherwise accentuate the selection or, in the case of a mouse click, by filtering its content based on the selected dimension values.

In another embodiment, rules may be defined to synchronize each of the BI blocks. For instance, for each BI block the rules defined may include a list of one or more BI blocks that can be impacted based upon a change performed on the propagatable dimension of the corresponding BI block. The rules may also include a list of BI blocks that have an ability to accept the changes to synchronize themselves with the associated BI blocks, a list of BI blocks that have an ability to propagate changes to other associated BI blocks, and the like. Based upon such rules, a group of BI blocks that have an ability to accept the propagated changes may be recognized. This group of BI blocks may be influenced based upon any changes made to one of the BI blocks in the list. In turn, this group of BI blocks need to be synchronized based upon the propagated changes of the associated BI blocks in the group.

Figure 2A:
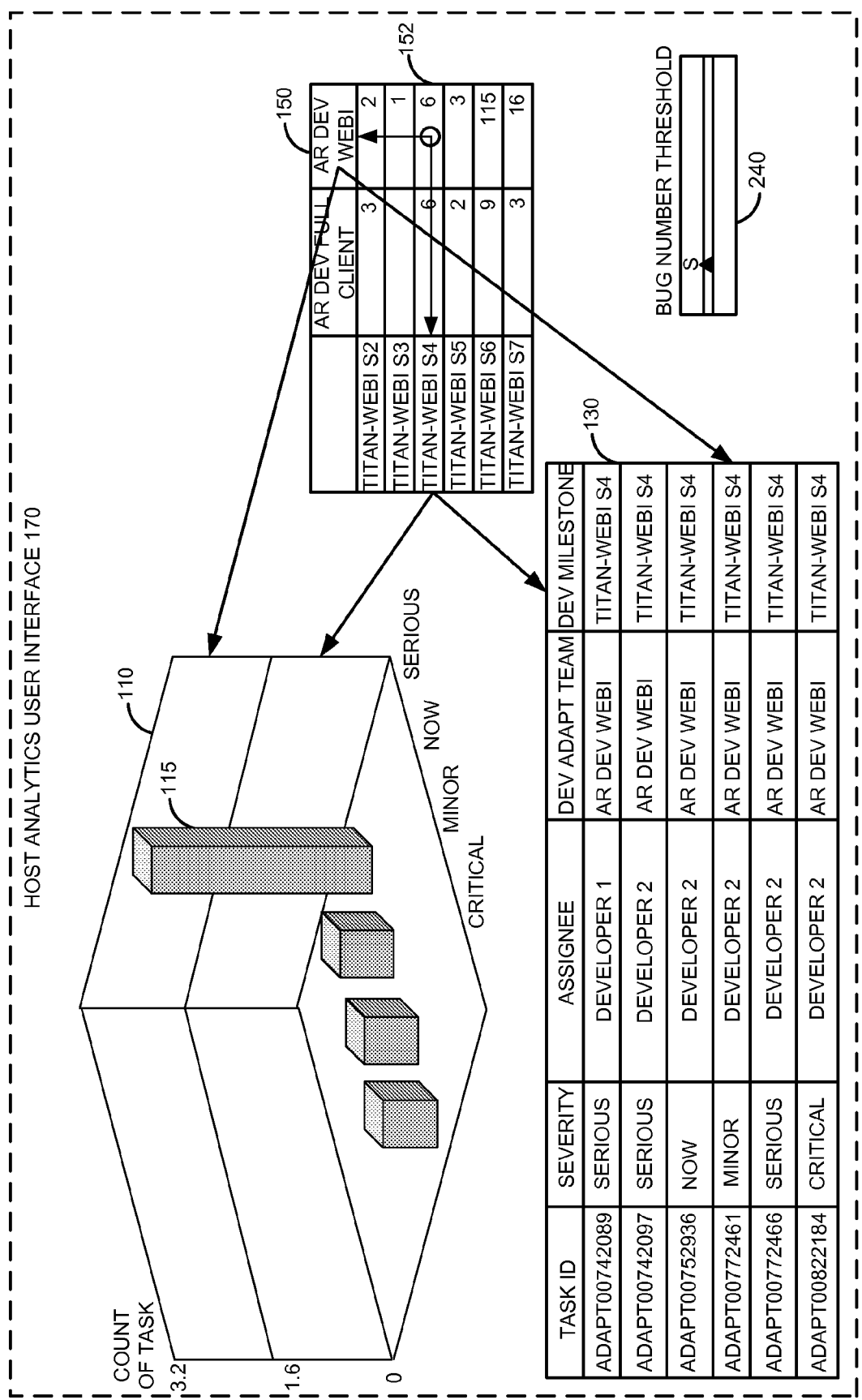
FIG. 2A illustrates data reporting and analysis for an exemplary business scenario, according to an embodiment of the invention.

FIG. 2A illustrates data reporting and analysis for an exemplary business scenario, according to an embodiment of the invention. The business scenario pertains to tracking data related to bug fixing tasks assigned to various software development teams. Data is imported from one or more data sources and added as BI Blocks 110, 130 and 150 into host analytics UI 170. BI block 150 displays the number of tasks for a given development team (DEV TEAM) and a development milestone (DEV MILESTONE). BI block 130 displays detailed data for tasks having a TASK ID for a given DEV TEAM and a DEV MILESTONE including the SEVERITY of the task and an ASSIGNEE of the task. BI block 110 displays a bar graph showing the number of tasks for every severity level (for example, CRITICAL, MINOR, NOW and SERIOUS) for a given DEV TEAM and a DEV MILESTONE. Thus, all BI blocks 110, 130 and 150 have development team (DEV TEAM) and a development milestone (DEV MILESTONE) as dimensions and BI blocks 110 and 130 share SEVERITY as a shared dimension. As a result, selecting a particular context to view data in one BI block may affect how the data is presented or viewed in another BI block based on the data models of the BI blocks and the host data context of host analytics UI 170.

In an embodiment, BI block 110 may not have synchronizable dimension, however, BI block 110 may display development team (DEV TEAM) and development milestone (DEV MILESTONE) as propagatable dimensions. Both BI block 130 and 150 have these dimensions in common as synchronizable dimensions. Hence, selecting a particular cell in BI block 110 will propagate the corresponding values of the propagatable dimensions for instance—the development milestone and the development team to the host data context. Further, BI blocks 130 and 150 will be notified of these changes (both development milestone and development team are synchronizable dimensions of 130 and 150) to filter their data and update their rendering. BI blocks need not be restricted to traditional report parts. For instance, a slider UI element such as the one at 240 can be synchronized with the other BI blocks (for example, 150) such that user interaction with slider element 240 could affect the display of BI block 150. This may result in displaying only block elements above a threshold number of bugs within BI block 150, if the threshold number of bugs has been recognized as a synchronizable dimension for BI block 150. This in turn could affect the display of the other BI blocks related to 150 such as 130 and 110.

Figure 2B:
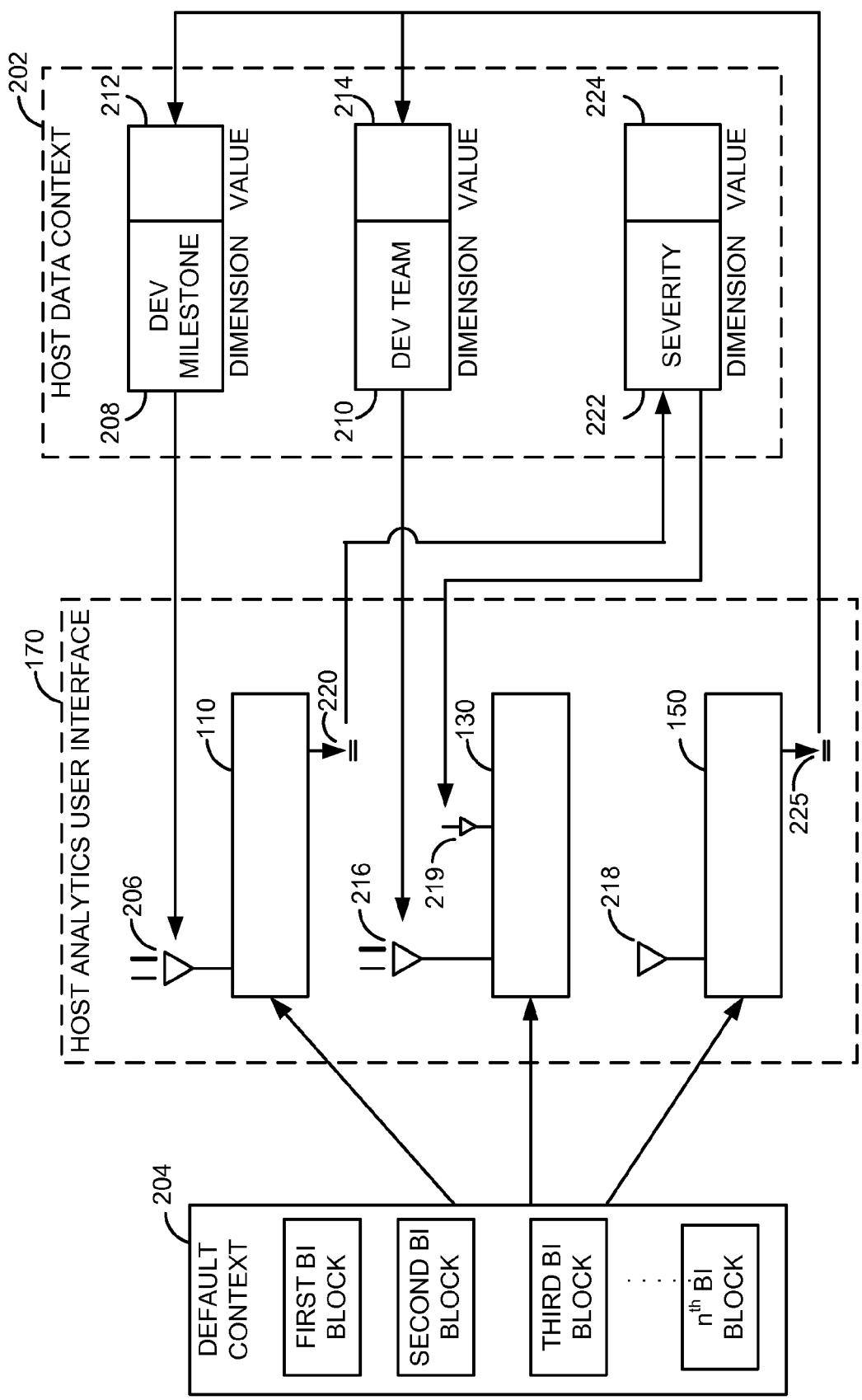
FIG. 2B illustrates a method of defining a host data context for synchronizing various BI blocks, according to an embodiment of the invention.

FIG. 2B illustrates a method of defining a host data context for synchronizing various BI blocks, according to an embodiment of the invention. The method illustrates how to define a container or host data context 202 according to which different BI blocks (for example, 110, 130 and 150) present in host analytics UI 170 can be synchronized. Default context 204 may host one or more BI blocks, and the BI block of interest (for example, 110, 130 and 150) may be imported from default context 204 to the host analytics UI 170. Considering the BI blocks described in FIG. 1, BI blocks 110 and 130 are defined to have two synchronizable dimensions DEV MILESTONE 208 and DEV TEAM 210 that have corresponding values at 212 and 214, respectively.

The association between the dimensions and the corresponding values is communicated to host analytics UI 170 by specifying that dimensions DEV MILESTONE 208 and DEV TEAM 210 are synchronizable dimensions for BI blocks 110 and 130 at 206 and 216, respectively. Even though BI block 150 shares some dimensions with BI blocks 110 and 130 (for example, DEV TEAM and DEV MILESTONE), BI block 150 may not have been included in a hierarchy to receive values for these dimensions from other BI blocks. As a result, at 218, BI block 150 does not have any synchronizable dimensions. However, at 225, BI block 150 has interaction rules that specify the user action with respect to dimensions DEV MILESTONE 208 and DEV TEAM 210 as being propagatable. In an embodiment, the interactive rules may be described as propagatable dimensions, which have an ability to propagate changes made to the BI block.

Based on the context described in FIG. 2B, if the end user clicks on BI block 150, the values of dimensions DEV MILESTONE 208 and DEV TEAM 210 are changed within the host data context 202 according to the interaction rule at 225. For example, if the cell 152 in FIG. 2A is selected, the value AR DEV WEBI for the context dimension DEV TEAM 210 and the value TITAN-WEBI S4 for the context dimension DEV MILESTONE 208 are propagated into the host data context 202 in FIG. 2B. Then, host analytics UI 170 finds the BI blocks which have at least one of these dimensions specified as synchronizable dimensions and propagates the new values accordingly. In this example, these new values are propagated to BI blocks 110 and 130 and the dimensions of these BI blocks are updated based on these changed values for DEV MILESTONE 208 and DEV TEAM 210.

Similarly, if the end user hovers the mouse cursor on top of one of the SEVERITY values 'SERIOUS' at 115 in BI block 110 of FIG. 2A, the hovered value 224 of SEVERITY 222 is propagated into host data context 202 and then propagated to BI block 130 since the SEVERITY 222 dimension is specified at 219 as a synchronizable dimension for BI block 130. The rendering of BI block 130 is then updated to show only those entries of rows with the severity value 'SERIOUS' stored in 224 that was selected by the user interaction with BI block 110 according to the rule of interaction defined at 220.

Furthermore, FIG. 2A and FIG. 2B show an embodiment with a single host analytics UI 170 with all BI blocks contained therein (for example, 110, 130 and 150) synchronized through a single host data context 202. However, the invention is not so limited. For instance, different sets of BI blocks contained within (or otherwise associated with) a single container or host data context can be synchronized with each other through different host data contexts. In other words, more than one host data context can be used to synchronize different BI blocks contained in a single container or host analytics UI. In one embodiment, a UI widget can be used to choose BI blocks that are to be synchronized with each other. Once selected, BI blocks that are synchronized with each other may be readily identified in the host analytics UI by sharing common UI characteristics such as shadow color, or may be contained within the same section or part of the container.

In one embodiment, any data that relates to a selected value of a synchronizable dimension or a propagatable dimension are highlighted or otherwise accentuated on the host analytics UI. In the previous example, only rows in BI block 130 that relate to the selected value of severity could be highlighted. In an embodiment, data in any of the host analytics UI is accentuated by graying out the data not relevant to a selected value of a synchronizable dimension or a propagatable dimension. In another embodiment, the data relating to the selected value of the synchronizable dimension or the propagatable dimension is highlighted or otherwise accentuated by changing the color of the data relating to the selected value of a context dimension. In yet another embodiment, only the data filtered according to the selected synchronizable dimension or propagatable dimension values are displayed in the impacted BI blocks. In yet another embodiment, if the BI blocks are defining the display of a graphic or chart, the related graphic or chart will be displayed according to values of any of the synchronizable dimension or the propagatable dimension selected from any of the BI blocks 110, 130 and 150.

Figure 3:
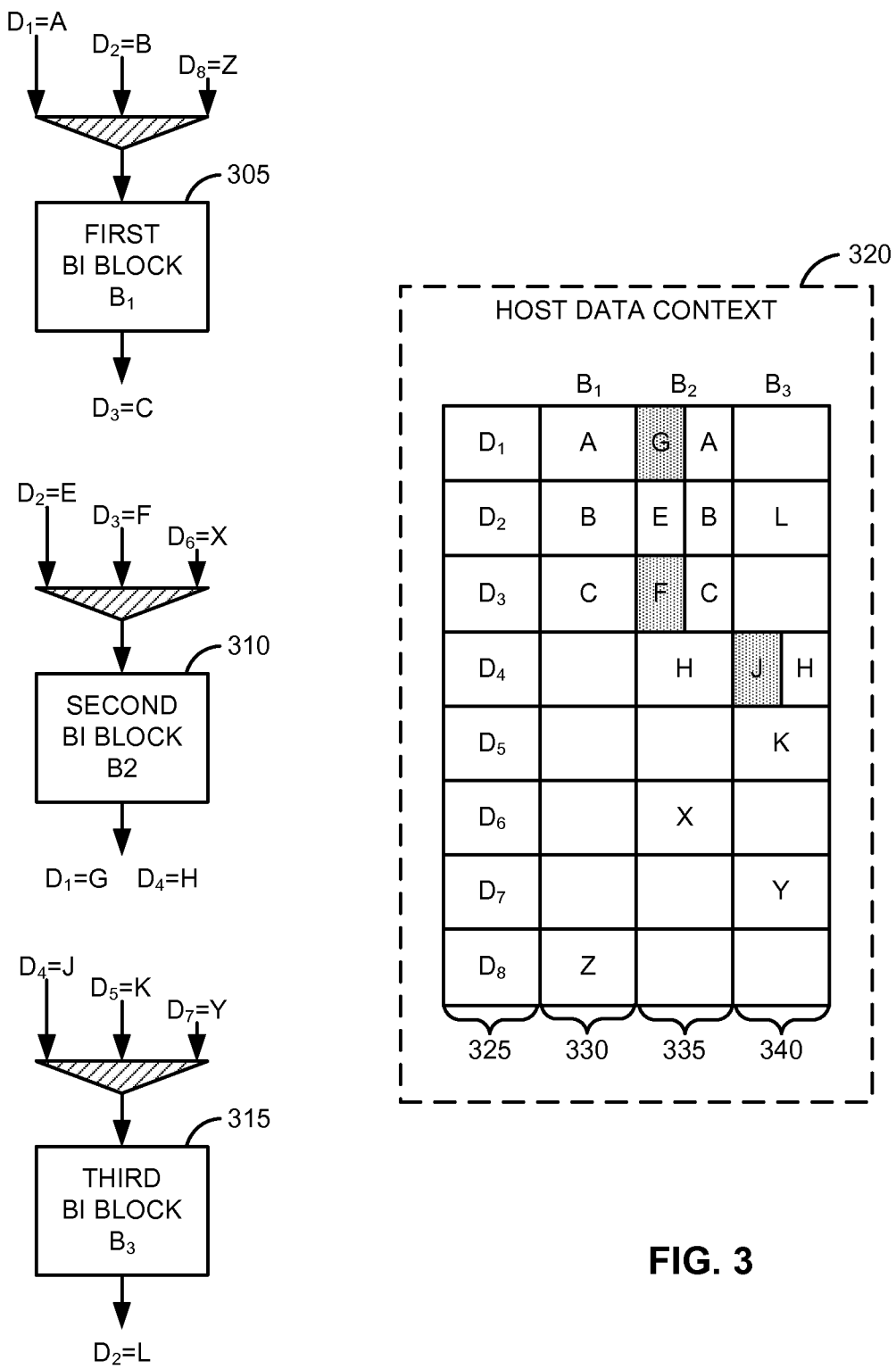
FIG. 3 illustrates synchronization of BI blocks, according to an embodiment of the invention.

FIG. 3 illustrates synchronization of BI blocks, according to an embodiment of the invention. First business intelligence (BI) block 305 is imported to a host analytics user interface (UI). Host data context 320 of the host analytics UI includes a list of synchronizable and propagatable dimensions (for example D1, D2, etc.) represented as 325. The dimensions of the BI blocks may be imported from a default context. The default context may store the BI blocks along with corresponding synchronizable dimensions and propagatable dimensions. In an embodiment, the propagatable dimension and synchronizable dimensions are inferred when the corresponding BI block is imported from a repository such as a report part, HTML page, and the like. For instance, in case of a table report part, filter dimensions may be used as synchronizable dimensions because when the values of the synchronizable dimensions change, the content of the report part needs to be refreshed accordingly and the corresponding visual display is updated. Similarly, columns of the table report may be used as propagatable dimensions because when the user clicks in one of the cell, the corresponding value of the related dimension column can be propagated.

First BI block 305 includes synchronizable dimensions 'D1', 'D2' and 'D8' adapted to synchronize values 'A', 'B' and 'Z' respectively of first BI block 305 with other BI blocks, and propagatable dimension 'D3' to propagate a value 'C' of first BI 305 block to other BI blocks. Host data context 320 of the host analytics UI is updated by propagating the value 'C' of the propagatable dimension 'D3' from first BI block 305.

Now, host data context 320 includes value 'C' propagated by the propagatable dimension 'D3'. The updated values for the dimensions of first BI block 305 in host data context 320, are represented as 330.

Second BI block 310 is imported to the host analytics UI. Second BI block 310 includes synchronizable dimensions 'D2', 'D3' and 'D6' adapted to synchronize values 'E', 'F' and 'X' respectively of second BI block 310 with other BI blocks, and propagatable dimensions 'D1' and 'D4' to propagate values 'G' and 'H' of second BI block 310 to other BI blocks, with at least one synchronizable dimension 'D3' of second BI block 310 in common with at least one dimension 'D3' that is defined in the host analytics context based on the first inserted block. The values of the synchronizable dimensions 'D2', 'D3' and 'D8' of second BI block 310 are synchronized to the updated host data context 320. Now, the values of the synchronizable dimensions of second BI block 310 are updated to reflect the values updated from the propagatable dimensions of the first BI block 305. This update occurs through host data context 320. For instance, host data context 320 for second BI block 310 is updated by updating value of 'D3' to 'C', and this is represented as 335. Once the synchronizable dimensions of second BI block 310 are retrieved from the host data context, content of the second BI block 310 is refreshed and the corresponding updated display is rendered on the host analytics UI. Similarly, when third BI block 315 is imported to the host analytics UI, host data context 320 updates the value 'J' of the respective synchronizable dimension 'D4' of third BI block 315 to reflect the value 'H' of the common propagatable dimension 'D4' of second BI block 310.

In an embodiment, a user input may be received on the host analytics UI, to modify the value 'C' of the propagatable dimension 'D3' of first BI block 305 to a new value 'M'. Host data context 320 of the host analytics UI is updated by propagating the new value 'M' of the propagatable dimension 'D3' of first BI block 305 to host data context 320. Based upon the updated value 'M' of the propagatable dimension 'D3' of first BI block 305, all other BI blocks having 'D3' as propagatable dimension (for example second BI block 310) are synchronized by changing the current values of the identical synchronizable dimension to the updated value 'M' of the propagatable dimension 'D3' of first BI block 305. Based upon a user selection that changes the display, first BI block 305 and all synchronized BI blocks are rendered on the host analytics UI.

Figure 4:
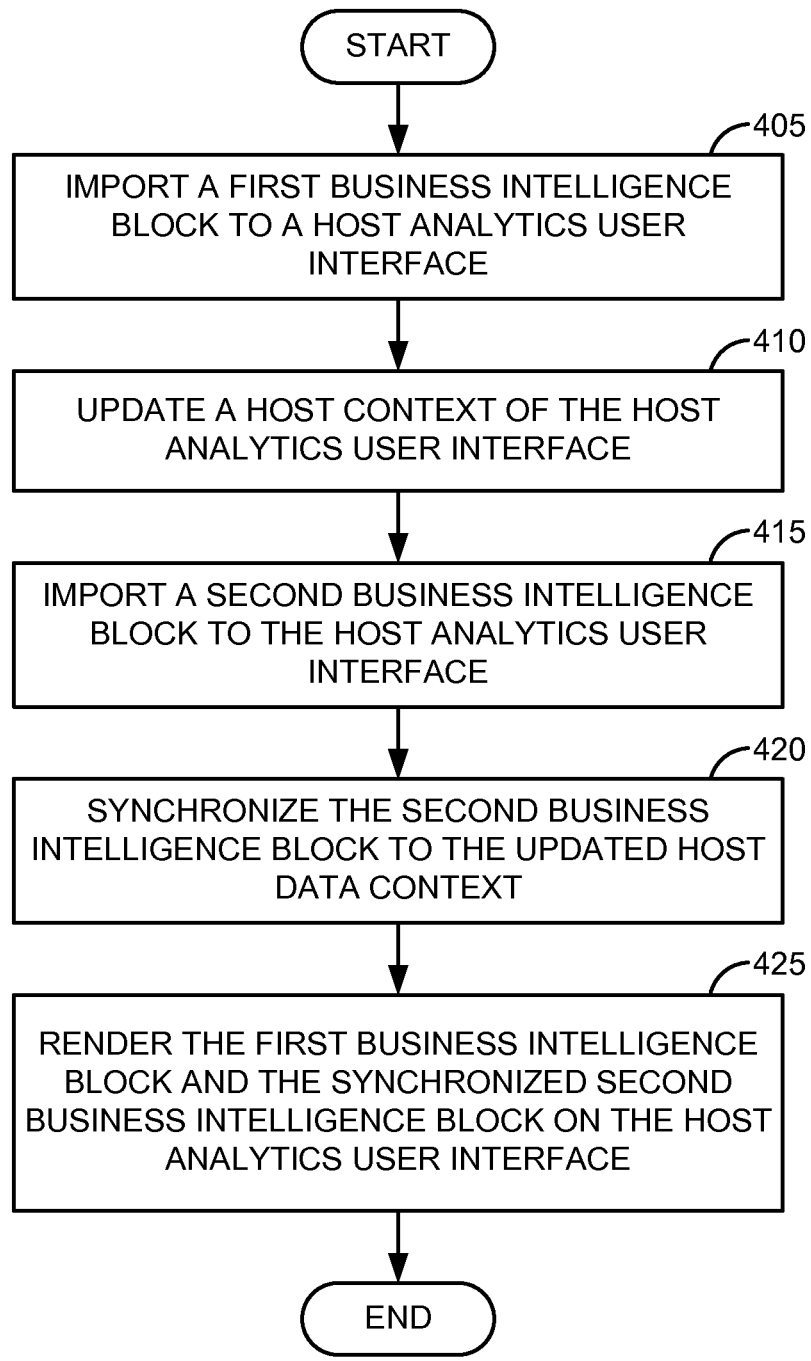
FIG. 4 illustrates a process for generating a composite data analytics user interface, according to another embodiment of the invention.

FIG. 4 illustrates a process for generating a composite data analytics user interface, according to another embodiment of the invention. At process block 405, a first business intelligence (BI) block is imported to a host analytics user interface (UI). The first BI block may include synchronizable dimensions adapted to synchronize values of the first BI block with other BI blocks, and propagatable dimensions to propagate values of the first BI block to other BI blocks. At process block 410, a host data context of the host analytics UI is updated by propagating the propagatable dimensions of the first BI block. In one embodiment, the host data context may supersede the context of the BI block being imported. In another embodiment, the context of the BI block being imported supersedes the host data context. At process block 415, a second BI block is imported to the host analytics UI. The second BI block may include a synchronizable dimension in common with at least one propagatable dimension of the first BI block. At process block 420, the synchronizable dimensions of the second BI block are synchronized to the host data context. At process block 425, the synchronized second BI block is rendered on the host analytics UI. In other words, BI block for which the synchronizable dimensions are updated, are rendered on the host analytics UI.

Figure 5:
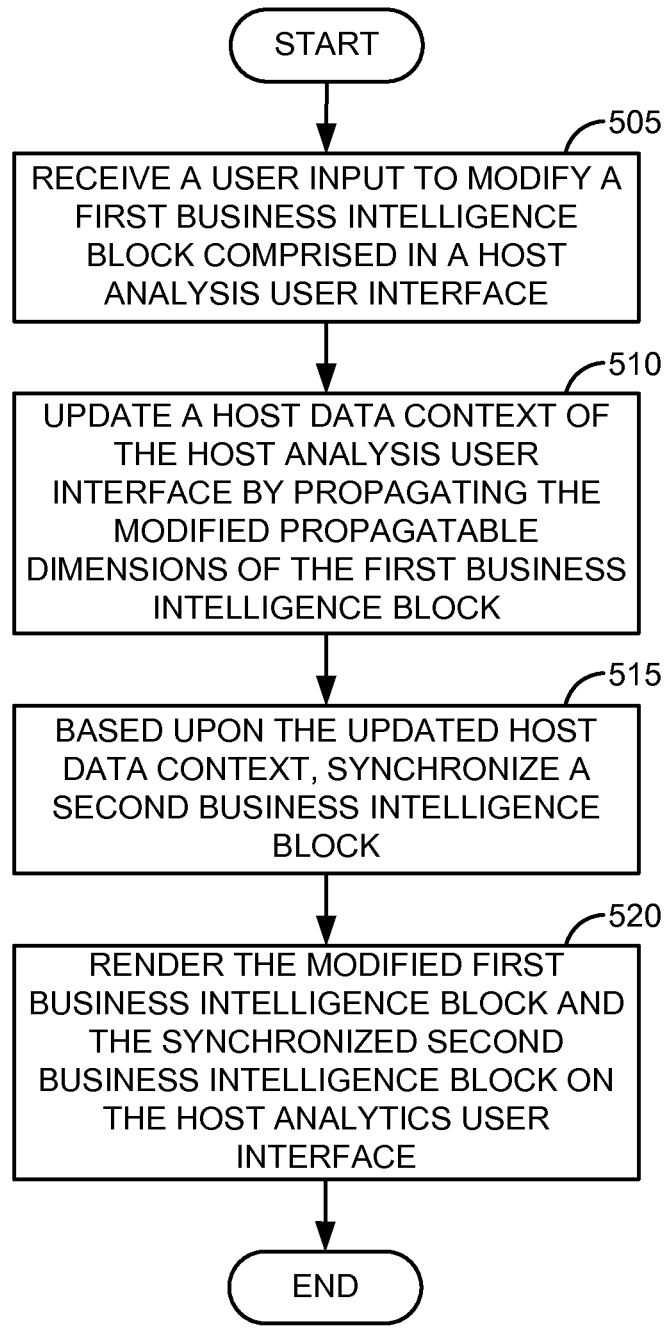
FIG. 5 illustrates a process for updating a composite data analytics user interface, according to another embodiment of the invention.

FIG. 5 illustrates a process for updating a composite data analytics user interface, according to another embodiment of the invention. At process block 505, a user input is received to modify the value of one or more propagatable dimensions of a first business intelligence (BI) block comprised in a host analysis user interface (UI). At process block 510, a host data context of the host analysis UI is updated based on the modified values of the propagatable dimensions of the first BI block. Based upon the updated host data context, the values are propagated to one or more synchronizable dimensions of a second BI block which becomes synchronized at process block 515. The second BI block may include at least one synchronizable dimension in common with at least one propagatable dimension of the first BI block. At process block 520, the synchronized second BI block is rendered on the host analytics UI.

Figure 6:
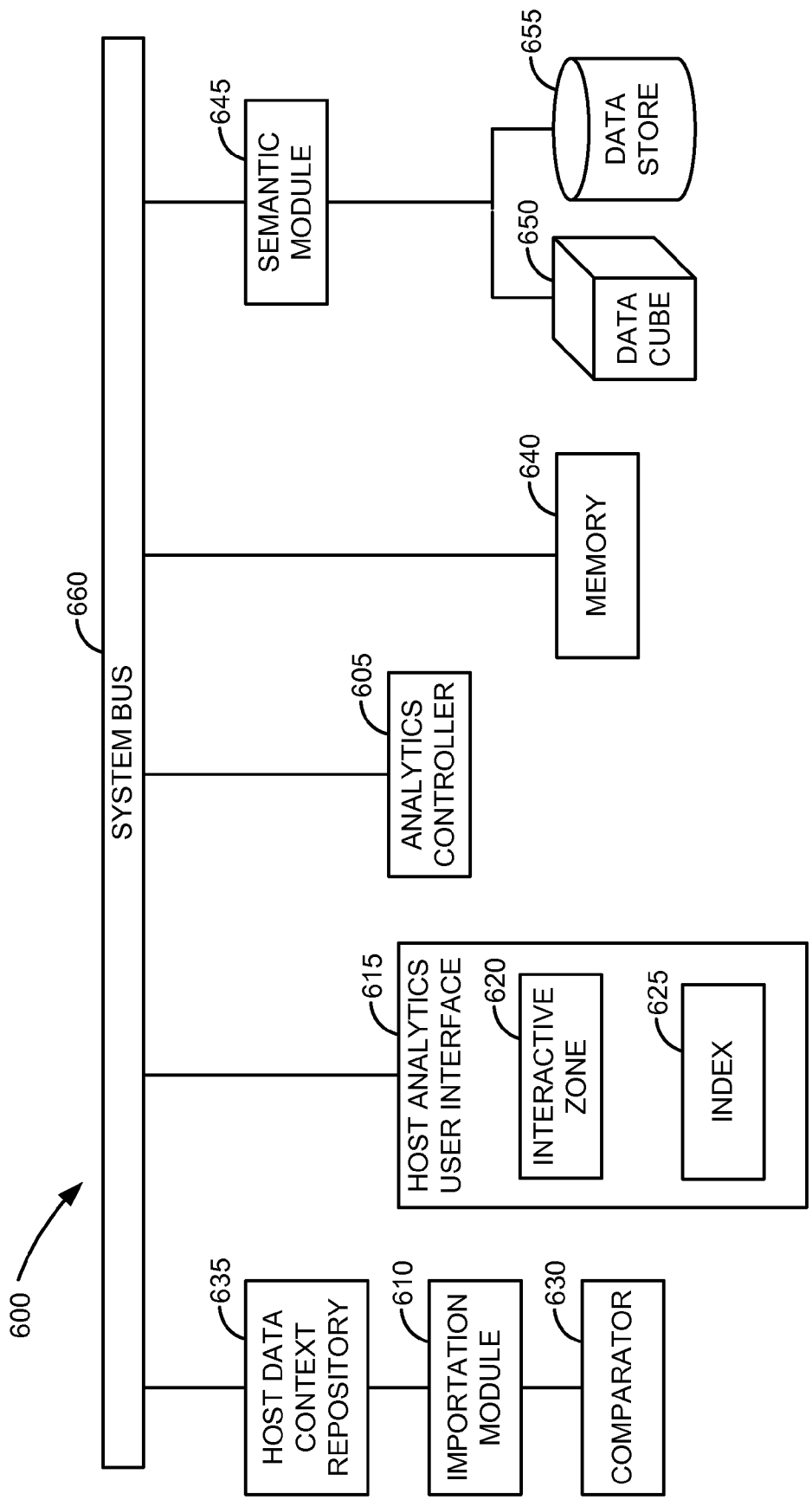
FIG. 6 is a block diagram of a system for data reporting and analysis, according to an embodiment of the invention.

FIG. 6 is a block diagram of a system for data reporting and analysis, according to an embodiment of the invention. System 600 includes analytics controller 605, importation module 610, host analytics user interface (UI) 615, with interactive zone 620 and index 625, comparator 630, host data context repository 635, memory 640, semantic module 645, data cube 650 and data source 655. Semantic module 645 stores all data and metadata relevant to reports in an analytical report. The semantic module 645 also stores the dependencies between dimensions and measures of every table in an analytical report. Semantic module 645 may obtain the data from data cube 650 of a multi-dimensional database or from other data source 655 such as a relational database or other structured/unstructured data sources. Host analytics user interface (UI) 615 is responsible for receiving a first business intelligence (BI) block and a second BI block. The first BI block and the second BI block propagatable dimensions and/or one or more synchronizable dimensions. In an embodiment, the synchronizable dimensions or the propagatable dimensions may not be present in the BI block. In such cases, the BI block without a propagatable dimension may not be able to propagate any dimension value to other BI blocks. Similarly, the BI block without a synchronizable dimension may not be able to synchronize itself based upon a dimension value received from another BI block.

Host analytics UI 615 acts as an interface between a user and rest of system 600. Importation module 610 is operable for identifying the synchronizable dimensions and propagatable dimensions that are associated with the first BI block and the second BI block. Memory 640 is responsible for storing data during the operation of system 600. For instance, memory 640 stores the identified synchronizable dimensions and propagatable dimensions of the first BI block and the second BI block. Analytical controller 605 controls the operation and communication between host analytics UI 615, importation module 610, comparator 630, host data context repository 635, and memory 640. Analytics controller 605 is operable to update a host data context of host analytics UI 615, by propagating the propagatable dimensions of the first BI block to host data context repository 635. Importation module 610 may enables a user to import one or more business intelligence (BI) blocks, and add the BI blocks to host analytics UI 615.

In one embodiment, importation module 610 may present a list of BI blocks to a user, to select from, and drag and drop into the interactive zone 620 of a container or host analytics UI 615. Each of the instances of imported BI block imported is linked to their respective contexts stored in memory 640, for instance. In an embodiment of the invention, it is possible to define new BI blocks soon after defining one or more dimensions of the BI blocks, or rendering BI blocks on host analytics UI 615, or determining a user interaction that might change a value of a dimension of the BI blocks. For example, an HTML page defined by a uniform resource locator (URL) with parameters, or a simple slider are available BI blocks. A first BI block is imported from importation module 610 to host analytics UI 615. The first BI block may include synchronizable dimensions adapted to synchronize content of the first BI block with other BI blocks, and propagatable dimensions to propagate values from the first BI block to other BI blocks. Index 625 organizes and synchronizes the synchronizable dimensions and propagatable dimensions of the first BI block. Analytics controller 605 updates host data context in host data context repository 635 by propagating the propagatable dimensions of the first BI block.

A second BI block is imported from importation module 610 to host analytics UI 615. The second BI block may include synchronizable dimensions and propagatable dimensions, in which one synchronizable dimension may be in common with at least one propagatable dimension of the first BI block. In an embodiment, the dimensions associated with the second BI block may not be present in host data context repository 635. In such cases, one or more values of the dimensions are considered to be defining the state of the new BI block. Index 625 organizes and synchronizes the synchronizable dimensions and propagatable dimensions of the second BI block. Comparator 630 synchronizes the synchronizable dimensions of the second BI block to the updated host data context in host data context repository 635 or updates the host data context with dimensions that are not already present. The first BI block and the synchronized second BI block are rendered on host analytics UI 615.

In an embodiment, a user input to modify one or more propagatable dimensions of the first BI block is received at host analytics UI 615. Analytics controller 605 updates host data context repository 635 by propagating the propagatable dimensions of the first BI block. Based upon the updated host data context in host data context repository 635, comparator 630 synchronizes the synchronizable dimensions of the second BI block. The modified first BI block and the synchronized second BI block are rendered on host analytics UI 615.

As each of the instances of the report parts are imported and added to host analytics UI 615, comparator 630 is responsible for synchronizing the BI blocks with the host data context present in host data context repository 635. The BI blocks are then parameterized by the parameterizer. The parameterization includes linking the data in the BI block to their respective data filters in the host data context in host data context repository 635. Once the values of a dimension are selected by a user from one of the BI blocks in host analytics UI 615, analytical controller 605 passes the selected dimension values to the synchronized BI blocks. This change in value is propagated by analytical controller 605 from the respective BI block to all other BI blocks in host analytics UI 615 that have the selected dimension as a synchronizable dimension. Each BI block may then import new data based on the changed value of the dimension and updates the affected BI block in host analytics UI 615.

The particular methods associated with embodiments of the invention are described in terms of computer software and hardware with reference to flowcharts. The methods to be performed by a computing device (for example, an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (for example, program, procedure, process, application, etc.), as taking an action or causing a result. Such expressions are merely a shorthand way of saying that execution of the software by a computing device causes the device to perform an action or produce a result.

Elements of the invention may also be provided as a machine-accessible medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for tangibly storing electronic instructions. For example, the invention may be implemented as a method performed in a client-server network with the execution the methods distributed across the network.

It should be appreciated that reference throughout this specification to one embodiment or an embodiment means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. For instance, the detailed description as set forth above includes descriptions of method steps. However, one skilled in the art will understand that the order of the steps set forth above is meant for the purposes of illustration only and the claimed invention is not meant to be limited only to the specific order in which the steps are set forth. Accordingly, the scope and spirit of the invention should be judged in terms of the claims, which follow.

What is claimed is:

1. An article of manufacture, comprising: a non-transitory machine-accessible medium comprising instructions that, when executed by a machine, cause the machine to perform operations comprising:

importing a first business intelligence (BI) block to a host analytics user interface (UI) by copying an instance of the first BI block from an analytical report to the host analytics user interface, the analytical report comprising one or more instances of the first BI block arranged in a hierarchy, each of the instances of the first BI block based on a combination of values of one or more dimensions identified as propagatable dimensions and synchronizable dimensions, the first BI block including at least one dimension designated as synchronizable and at least one dimension designated as propagatable;

propagating at least one of the propagatable dimensions of the first BI block by storing the propagatable dimensions in a host data context associated with the host analytics UI;

importing a second BI block to the host analytics UI, the second BI block including at least one dimension that is designated as synchronizable in common with the at least one propagatable dimension of the first BI block; and upon determining at least one of the propagatable dimensions of the first BI block that is in common with at least one of the synchronizable dimensions of the second BI block, propagating only the common propagatable dimensions of the first BI block from the host data context to the corresponding common synchronizable dimensions of the second BI block by modifying values of the common synchronizable dimension of the second BI block to match values of the corresponding propagatable dimension of the first BI block.

2. The article of manufacture of claim 1 further comprising rendering the first BI block and the modified second BI block on the host analytics UI.

3. The article of manufacture of claim 1, further comprising: modifying the one or more synchronizable dimensions of the first BI block by accepting values from propagatable dimensions of one or more other BI blocks.

4. The article of manufacture of claim 1, further comprising propagating a change of value performed on the first BI block by the propagatable dimensions.

5. The article of manufacture of claim 1, wherein updating the host data context of the host analytics UI further comprises:
    determining one or more values of the propagatable dimensions of the first BI block; and
    changing one or more values of the host data context to match the values of the propagatable dimensions of the first BI block.

6. The article of manufacture of claim 1, further comprising to propagate a change made to the propagatable dimension of the second BI block to one or more other BI blocks by one or more propagatable dimensions of the second BI block.

7. The article of manufacture of claim 1, wherein the host data context is updated based upon one or more rules defining acceptable over-writing of one or more values of the synchronizable dimensions and the propagatable dimensions of the first BI block.

8. The article of manufacture of claim 1, wherein synchronizing the common synchronizable dimensions of the second BI block further comprises:
    adding the synchronizable dimensions of the second BI block into the host data context; and
    generating a data filter for every synchronizable dimensions of the second BI block, with the values available in the host data context.

9. A computer implemented method for generating a composite data analytics user interface, the method comprising:
    importing a first business intelligence (BI) block to a host analytics user interface (UI) by copying an instance of the first BI block from an analytical report to the host analytics user interface, the analytical report comprising one or more instances of the first BI block arranged in a hierarchy, each of the instances of the first BI block based on a combination of values of one or more dimensions identified as propagatable dimensions and synchronizable dimensions, the first BI block including at least one dimension designated as synchronizable and at least one dimension designated as propagatable;
    propagating at least one of the propagatable dimensions of the first BI block by storing the propagatable dimensions in a host data context associated with the host analytics UI;
    importing a second BI block to the host analytics UI, the second BI block including at least one dimension that is designated as synchronizable in common with the at least one propagatable dimension of the first BI block;

upon determining at least one of the propagatable dimensions of the first BI block that is in common with at least one of the synchronizable dimensions of the second BI block, propagating only the common propagatable dimensions of the first BI block from the host data context to the corresponding common synchronizable dimensions of the second BI block by modifying values of the common synchronizable dimension of the second BI block to match values of the corresponding propagatable dimension of the first BI block; and generating a composite data analytics UI by rendering the first BI block and the second BI block including the modified values of the common synchronizable dimension.

10. A computing device to generate a composite data analytics user interface, comprising:
    a processor to read and execute instructions stored in one or more memory elements; and
    the one or more memory elements storing instructions related to:
        an importation module to import a first business intelligence (BI) block on to a host analytics user interface (UI), by copying an instance of the first BI block from an analytical report to the host analytics user interface, the analytical report comprising one or more instances of the first BI block arranged in a hierarchy, each of the instances of the first BI block based on a combination of values of one or more dimensions identified as propagatable dimensions and synchronizable dimensions, the first BI block including at least one dimension designated as synchronizable and at least one dimension designated as propagatable;
        analytics controller to propagate at least one of the propagatable dimensions of the first BI block by storing the propagatable dimensions in a host data context associated with the host analytics UI;
        the importation module to import a second BI block to the host analytics UI, the second BI block including at least one dimension that is designated as synchronizable in common with the at least one propagatable dimension of the first BI block; and
        a comparator to determine at least one of the propagatable dimensions of the first BI block that is in common with at least one of the synchronizable dimensions of the second BI block, and to propagate only the common propagatable dimensions of the first BI block from the host data context to the corresponding common synchronizable dimensions of the second BI block by modifying values of the common synchronizable dimension of the second BI block to match values of the corresponding propagatable dimension of the first BI block.

11. The computing device of claim 10 further comprising: an index to organize and synchronize at least the first and the second BI blocks within the host data context.

12. The computing device of claim 10, wherein the host analytics UI is operable to receive a user interaction, including a mouse hover or a mouse click.

13. The computing device of claim 10, wherein the analytical controller is operable to transform user interaction into a change of one or more dimension values in the host data context, and to propagate the changed values to one or more BI blocks.

14. An article of manufacture, comprising a non-transitory machine-accessible medium comprising machine readable instructions which when executed by a machine, cause the machine to perform a method comprising:

importing a first business intelligence block to the host analytics user interface (UI) by copying an instance of the first BI block from an analytical report to the host analytics UI, the analytical report comprising one or more instances of the first BI block arranged in a hierarchy, each of the instances of the first BI block based on a combination of values of one or more dimensions identified as propagatable dimensions and synchronizable dimensions, the first BI block including at least one dimension designated as synchronizable and at least one dimension designated as propagatable;

receiving an input to modify at least one propagatable dimension of the first BI block comprised in the host analysis UI;

based upon the received input, updating the host analytics UI by modifying the one or more propagatable dimensions of the first BI block and propagating at least one of the modified propagatable dimensions of the first BI block;

based upon the updated host analytics UI, synchronizing a second BI block including at least one dimension that is designated as synchronizable in common with the at least one modified propagatable dimension of the first BI block by: propagating only the common modified propagatable dimension of the first BI block from the host data context to the corresponding common synchronizable dimensions of the second BI block by modifying values of the common synchronizable dimension of the second BI block to match values of the corresponding modified propagatable dimension of the first BI block; and rendering the modified first BI block and the synchronized second BI block on the host analytics UI.

15. The article of manufacture of claim 14 further comprising: modifying the propagatable dimensions of the first BI block by changing one or more values of the propagatable dimensions of the first BI block.

16. A computer implemented method for updating a composite data analytics user interface for rendering analytical business information, the method comprising:

importing a first business intelligence block to the host analytics UI by copying an instance of the first BI block from an analytical report to the host analytics user interface, the analytical report comprising one or more instances of the first BI block arranged in a hierarchy, each of the instances of the first BI block based on a combination of values of one or more dimensions identified as propagatable dimensions and synchronizable dimensions, the first BI block including at least one dimension designated as synchronizable and at least one dimension designated as propagatable;

receiving an input to modify at least one propagatable dimension of the first BI block comprised in the host analysis UI;

based upon the received input, updating the host analytics UI by modifying the one or more propagatable dimensions of the first BI block and propagating at least one of the modified propagatable dimensions of the first BI block;

based upon the updated host analytics UI, synchronizing a second BI block including at least one dimension that is designated as synchronizable in common with the at least one modified propagatable dimension of the first BI block by: propagating only the common modified propagatable dimension of the first BI block from the host data context to the corresponding common synchronizable dimensions of the second BI block by modifying values of the common synchronizable dimension of the second BI block to match values of the corresponding modified propagatable dimension of the first BI block; and rendering the modified first BI block and the synchronized second BI block on the host analytics UI.

\* \* \* \* \*